United States Patent
Chen

(10) Patent No.: US 11,448,888 B2
(45) Date of Patent: Sep. 20, 2022

(54) DETECTION LIGHT SOURCE MODULE AND DETECTION DEVICE

(71) Applicant: Wistron Corporation, New Taipei (TW)

(72) Inventor: Yu-Lin Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 217 days.

(21) Appl. No.: 16/592,772

(22) Filed: Oct. 4, 2019

(65) Prior Publication Data

US 2021/0018759 A1 Jan. 21, 2021

(30) Foreign Application Priority Data

Jul. 19, 2019 (TW) ................................ 108125719

(51) Int. Cl.
*G02B 27/09* (2006.01)
*G02B 3/02* (2006.01)
*G02B 3/00* (2006.01)

(52) U.S. Cl.
CPC ........... *G02B 27/0927* (2013.01); *G02B 3/02* (2013.01); *G02B 27/0955* (2013.01); *G02B 2003/0093* (2013.01)

(58) Field of Classification Search
CPC ........ G02B 27/09; G02B 27/10; G02B 27/30; G02B 27/0927; G02B 27/0922;

(Continued)

(56) References Cited

U.S. PATENT DOCUMENTS 8,031,414 B1 * 10/2011 Liu ..................... G02B 27/0927
359/796
9,182,340 B2 11/2015 Kao et al.
(Continued)

FOREIGN PATENT DOCUMENTS

CN 103792190 5/2014
TW 201913032 4/2019

OTHER PUBLICATIONS

Wallace Latimer, "Transforming Gaussian Beams into Uniform, Rectangular Intensity Distributions"; Photonics/Optics, Jan. 1, 2012 (Year: 2012).*

(Continued)

*Primary Examiner* — Jie Lei
(74) *Attorney, Agent, or Firm* — JCIPRNET

(57) ABSTRACT

A detection light source module and a detection device are provided. The detection light source module includes a light emitting component, a light shape adjusting component, and a single band pass filter. The light emitting component is adapted to provide a light beam. The light shape adjusting component is located on a transmission path of the light beam and is adapted to adjust a light shape of the light beam. The light beam forms a strip lighting region through the light shape adjusting component, wherein the strip lighting region has a plurality of sub-lighting regions. The sub-lighting regions have the same size and do not overlap each other. The single band pass filter is located on the transmission path of the light beam and is located between the light emitting component and the light shape adjusting component.

9 Claims, 8 Drawing Sheets

(58) Field of Classification Search
CPC ............ G02B 27/0955; G02B 27/1093; G02B 27/106; G02B 3/02; G02B 9/00; G02B 27/42; G02B 27/4266; G02B 5/18; G02B 5/1814; G02B 2003/0093; G02B 19/0014; G02B 19/0047; G02B 27/0966; G02B 27/0972; G02B 5/00; G02B 5/04; G01N 21/00; G01N 21/253; G01N 21/25; G01N 21/59; G01N 2201/0415; G01N 2201/0626; G01N 2201/0633; G01N 21/01
USPC ........ 359/708, 710, 796, 741, 641; 356/432, 356/435, 418
See application file for complete search history.

(56) References Cited

U.S. PATENT DOCUMENTS

| | | |
|---|---|---|
| 10,508,971 B2 | 12/2019 | Lee et al. |
| 2003/0062415 A1 | 4/2003 | Tsikos et al. |
| 2014/0118743 A1 | 5/2014 | Kao et al. |
| 2019/0072454 A1 | 3/2019 | Lee et al. |
| 2020/0116588 A1 | 4/2020 | Lee et al. |

OTHER PUBLICATIONS

"Office Action of Taiwan Counterpart Application", dated Apr. 1, 2020, p. 1-p. 6.

\* cited by examiner

DETECTION LIGHT SOURCE MODULE AND DETECTION DEVICE

CROSS-REFERENCE TO RELATED APPLICATION

This application claims the priority benefit of Taiwan application serial no. 108125719, filed on Jul. 19, 2019. The entirety of the above-mentioned patent application is hereby incorporated by reference herein and made a part of this specification.

BACKGROUND

Technical Field

The disclosure relates to a light source module and a detection device, and in particular, to a detection light source module and a detection device.

Description of Related Art

When a plurality of objects to be detected are detected with the existing detection device, the objects to be detected may be juxtaposed so as to complete the detection of as many objects to be detected as possible in a limited space. However, in the detection process, a detection light source is required to uniformly illuminate the objects to be detected. Since the spatial intensity of most light sources exhibits a Gaussian distribution, when the objects to be detected are at different positions in the space, a plurality of light sources may be arranged and the spacing between the light sources may be appropriately adjusted, so as to superimpose the light intensity on the edges of the light sources to be the same as the light intensity at the centers of the light sources to form a uniform light source with a flat top distribution, thereby illuminating each object to be detected uniformly.

However, in this way, during the actual product manufacture process, since the brightness errors among the respective light sources need to be individually adjusted and compensated to ensure that each object to be detected is irradiated with an equal amount of luminous flux, the manufacturing and assembling complexity is increased. Besides, in order to ensure the detection accuracy, the OD values of the respective band pass filters for filtering the cutoff wavelengths of the respective light sources are required to reach the level of OD6, that is, the magnitudes of the passage rates of cutoff bands passing through the respective band pass filters are required to be less than or equal to $10^{-6}$. In this way, when the number of objects to be detected is increased, the number of the corresponding light sources and band pass filters must also be increased. As a result, the product cost may be increased. Besides, the brightness errors and performance differences among the light sources may also result in errors of the adjusted luminous flux, which affect the detection accuracy and the reliability of the detection result.

SUMMARY

The disclosure provides a detection light source module, which can provide a uniform strip light source.

The disclosure provides a detection device, which has good detection accuracy and is at a low cost.

A detection light source module according to an embodiment of the disclosure includes a light emitting component, a light shape adjusting component, and a single band pass filter. The light emitting component is adapted to provide a light beam. The light shape adjusting component is located on a transmission path of the light beam and adapted to adjust a light shape of the light beam. The light beam forms a strip lighting region through the light shape adjusting component, the strip lighting region includes a plurality of sub-lighting regions, and the sub-lighting regions have the same size and do not overlap each other. The single band pass filter is located on the transmission path of the light beam and is located between the light emitting component and the light shape adjusting component.

A detection device according to an embodiment of the disclosure includes the detection light source module and a frame. The frame has a plurality of sleeve structures for accommodating a plurality of objects to be detected, where a surface, facing the detection light source module, of each of the sleeve structures is provided with an opening, and each of the openings exposes each of the objects to be detected and corresponds to each of the sub-lighting regions, so that the object to be detected accommodated in each of the sleeve structures is located in each of the sub-lighting regions.

In an embodiment of the disclosure, the strip lighting region has a first length in a first direction and has a second length in a second direction, and the second length is greater than the first length.

In an embodiment of the disclosure, each of the openings has a first dimension in the first direction. The frame includes a first end and a second end in the second direction. A second dimension is provided between an edge of one of the openings closest to the first end and an edge of another of the openings closest to the second end. The first length of the strip lighting region is greater than the first dimension. The second length of the strip lighting region is greater than the second dimension.

In an embodiment of the disclosure, the light shape adjusting component includes a light incidence surface, a side surface, and a light emergence surface. The side surface connects the light incidence surface and the light emergence surface. The light incidence surface protrudes toward the light emitting component. A projection of a first curve formed by connecting the light incidence surface and the side surface on a first reference plane is a first contour line. A normal vector of the first reference plane is parallel to the first direction, and the first contour line protrudes toward the light emitting component.

In an embodiment of the disclosure, the first contour line includes a first curved line segment and two second curved line segments. The first curved line segment connects the two second curved line segments. The first curved line segment is a circular arc line segment, and the two second curved line segments are parabolic line segments.

In an embodiment of the disclosure, the first curved line segment is of a first width in the second direction, the first width corresponds to a full width at half maximum of a distribution curve of a luminous flux of the light beam in the second direction.

In an embodiment of the disclosure, the light emergence surface is a spherical surface and protrudes toward a side away from the light emitting component.

In an embodiment of the disclosure, a ratio of a difference between a luminous flux passing through any of the sub-lighting regions and a luminous flux passing through another sub-lighting region of the sub-lighting regions to an averaged luminous flux passing through the sub-lighting regions is not greater than 4%.

Based on the above, according to the detection light source module and the detection device of the disclosure, with the configuration of the light shape adjusting component, the strip lighting region can be formed by providing only the single light emitting component and the single band pass filter. In addition, the difference between the luminous flux passing through any of the sub-lighting regions of the strip lighting region and the luminous flux passing through another sub-lighting region is kept at a certain ratio, and the objects to be detected at different positions in the space can be uniformly illuminated at the same time. As a result, uniform lighting can be performed at a large scale and in a high efficiency in a limited space. In this way, the required numbers of the light emitting components and the corresponding band pass filters in the detection light source module and the detection device can be reduced, the light path can be simplified, and the complexity manufacturing and assembling can be reduced, thereby reducing the product cost and improving the manufacturing quality. Moreover, the detection accuracy and reliability of the detection device using the detection light source module can be improved as well.

In order to make the aforementioned and other objectives and advantages of the disclosure comprehensible, embodiments accompanied with figures are described in detail below.

DESCRIPTION OF THE EMBODIMENTS

Figure 1A:
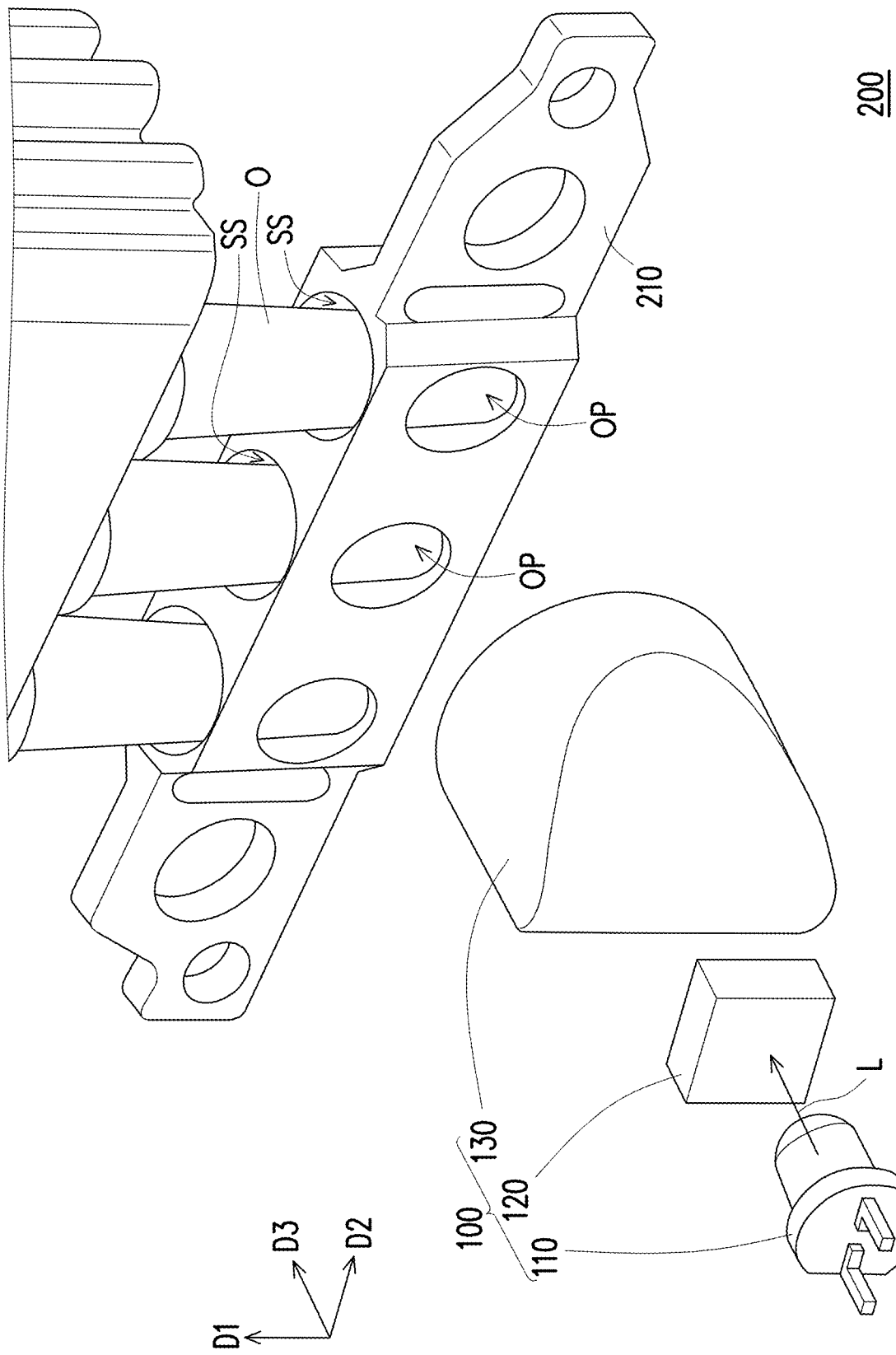
FIG. 1A is a schematic structural view of a detection device according to an embodiment of the disclosure.
Figure 1B:
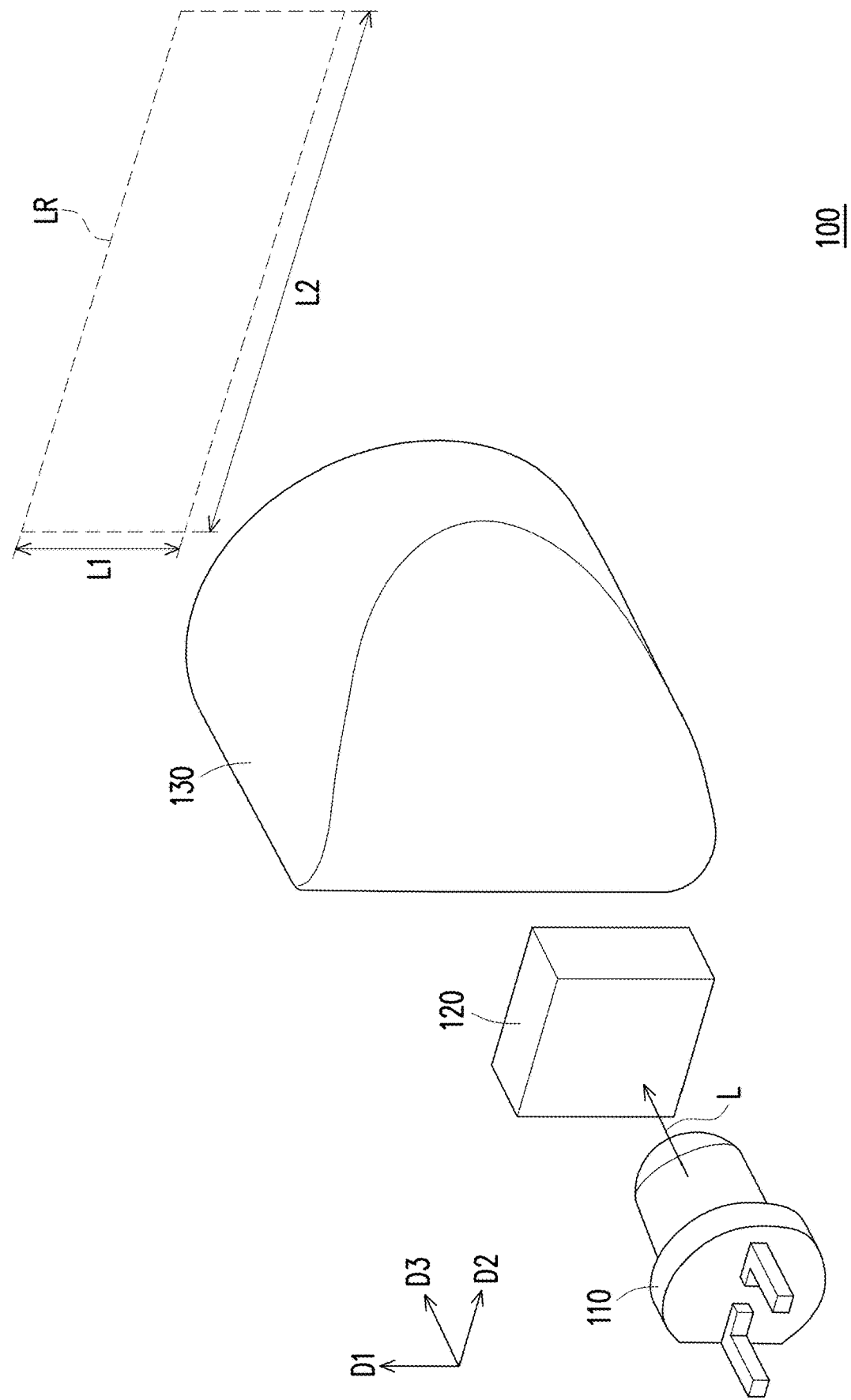
FIG. 1B is a schematic view of a detection light source module of FIG. 1A and a strip lighting region formed by the detection light source.
Figure 1C:
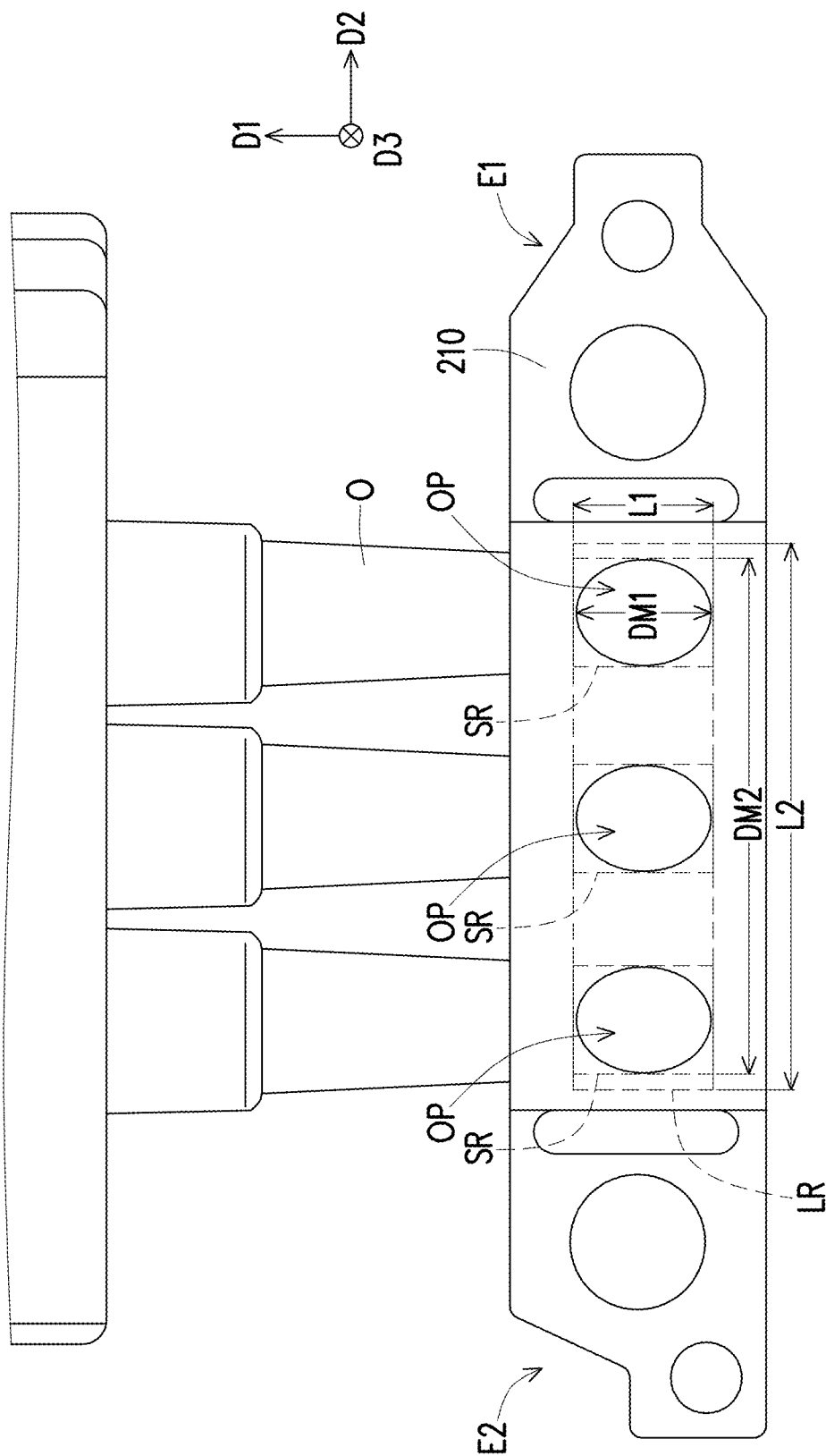
FIG. 1C is a schematic front view of an object to be detected and the strip lighting region of FIG. 1A.

FIG. 1A is a schematic structural view of a detection device 200 according to an embodiment of the disclosure. FIG. 1B is a schematic view of a detection light source module 100 of FIG. 1A and a strip lighting region LR formed by the detection light source module 100. FIG. 1C is a schematic front view of an object to be detected O and the strip lighting region LR of FIG. 1A. Referring to FIG. 1A to FIG. 1C, the detection device 200 of the present embodiment includes a detection light source module 100 and a frame 210. Specifically, as shown in FIG. 1A to FIG. 1C, in the present embodiment, the detection light source module 100 includes a light emitting component 110 and a light shape adjusting component 130. Besides, as shown in FIG. 1A to FIG. 1C, the detection light source module 100 further includes a single band pass filter 120, located between the light emitting component 110 and the light shape adjusting component 130. For example, in the present embodiment, the light shape adjusting component 130 may be a linear prism, and a cutoff depth of the band pass filter 120, that is, an OD value is at the level of OD6. In other words, the magnitude of the passage rate of a cutoff band passing through the band pass filter 120 is about $10^{-6}$. On the other hand, as shown in FIG. 1A and FIG. 1C, in the present embodiment, the frame 210 has a plurality of sleeve structures SS for accommodating a plurality of objects to be detected O, where a surface, facing the detection light source module 100, of each sleeve structure SS is provided with an opening OP, and each opening OP exposes each object to be detected O to receive a light beam L from the detection light source module 100.

Figure 2:
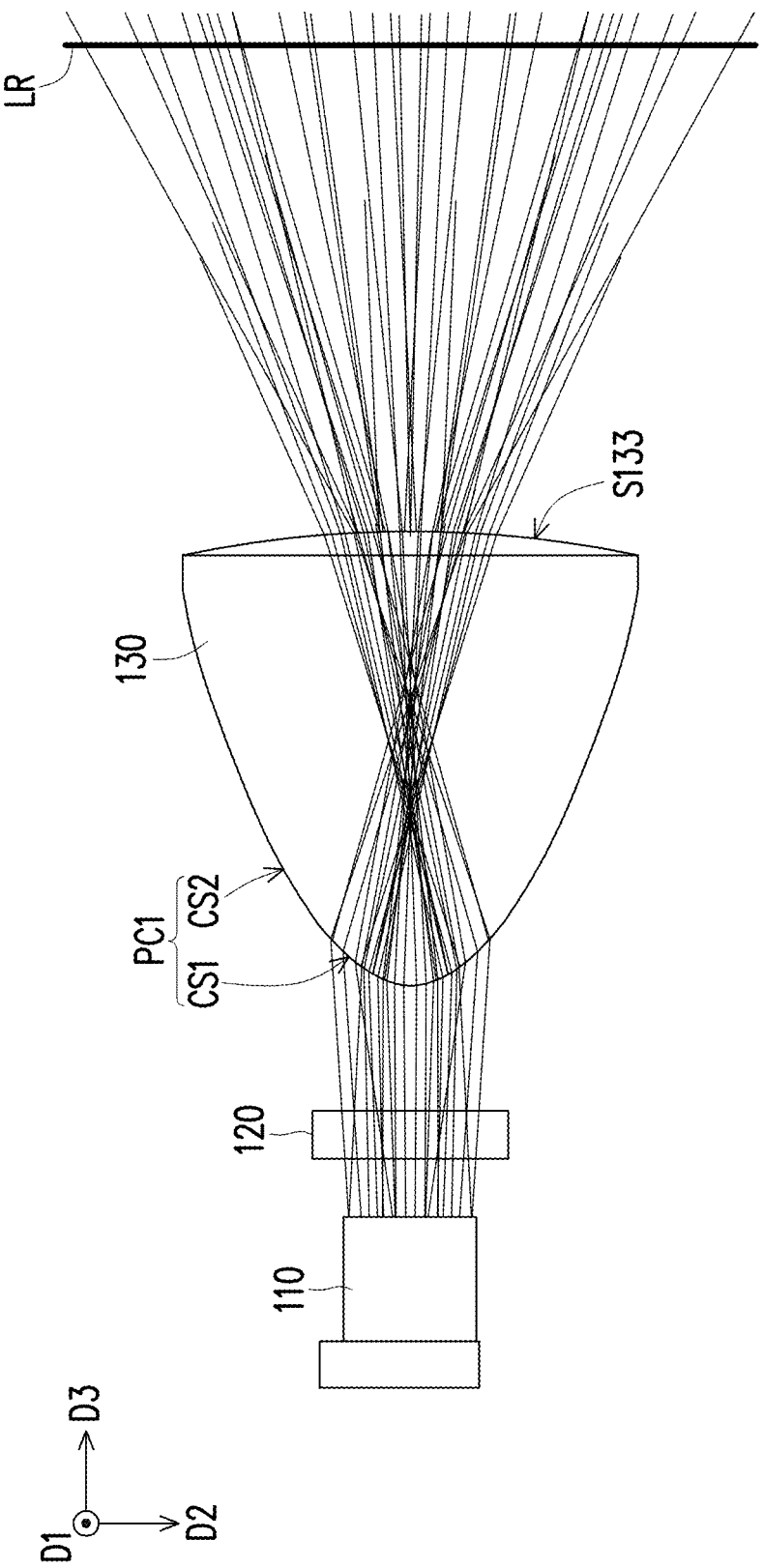
FIG. 2 is a schematic view of a light path of the detection light source module of FIG. 1A.

FIG. 2 is a schematic view of a light path of the detection light source module 100 of FIG. 1A. Specifically, as shown in FIG. 2, in the present embodiment, the light emitting component 110 is adapted to provide a light beam L, and may be used to detect an object to be detected O. The band pass filter 120 and the light shape adjusting component 130 are located on a transmission path of the light beam L, and the light shape adjusting component 130 is adapted to adjust a light shape of the light beam L. Further, as shown in FIG. 1B to FIG. 2, the light beam L forms a strip lighting region LR through the light shape adjusting component 130. In detail, as shown in FIG. 1B to FIG. 1C, the strip lighting region LR has a first length L1 in a first direction D1 and has a second length L2 in a second direction D2, the second length L2 being greater than the first length L1. For example, in the present embodiment, the first direction D1, the second direction D2, and a principal optical axis direction D3 of the light emitting component 110 are perpendicular to each other.

On the other hand, as shown in FIG. 1C, each opening OP of the frame 210 has a first dimension DM1 in the first direction D1. The frame 210 has a first end E1 and a second end E2 in the second direction D2. A second dimension DM2 is provided between an edge of one of the openings OP closest to the first end E1 and an edge of another of the openings OP closest to the second end E2. Specifically, in the present embodiment, the first length L1 of the strip lighting region LR is greater than the first dimension DM1, and the second length L2 of the strip lighting region LR is greater than the second dimension DM2.

In more detail, in the present embodiment, a ratio of the second length L2 to the second dimension DM2 is greater than 1 and less than 1.15. Thus, the strip lighting region LR can cover the openings OP without excessive diffusion. For example, in an embodiment, the dimensions of each opening OP in the first direction D1 and the second direction D2 may be 3.4 mm and 2.6 mm, respectively. The first dimension DM1 of the frame 210 is 3.4 mm, and the second dimension DM2 may be 12.6 mm. At this time, the first length L1 of the strip lighting region LR in the first direction D1 may be designed to be greater than about 3.4 mm, and the second length L2 in the second direction D2 may be designed to be 14.6 mm. It is to be noted that the value ranges here are intended to be illustrative only and not to limit the disclosure.

Moreover, as shown in FIG. 1C, the strip lighting region LR may be further divided into a plurality of sub-lighting regions SR, and each sub-lighting region SR corresponds to the opening OP of each sleeve structure SS, so that at least a portion of the object to be detected accommodated in each sleeve structure SS is located in each sub-lighting region SR of the strip lighting region LR.

The structure of the light shape adjusting component 130 and how the light shape adjusting component 130 adjusts the light shape of the light beam L provided by the light emitting component 110 will be further described below with reference to FIG. 3A to FIG. 4D.

FIG. 3A to FIG. 3D are schematic structural views of the light shape adjusting component 130 of FIG. 1A at different viewing angles. FIG. 4A is a light shape distribution diagram and a schematic light emitting distribution curve diagram of the light beam L of FIG. 2 before the light beam L passes through the light shape adjusting component 130. FIG. 4B is a light shape distribution diagram and a schematic light emitting distribution curve diagram of the light beam L of FIG. 2 after the light beam L passes through the light shape adjusting component 130. Specifically, as shown in FIG. 3A to FIG. 3D, in the present embodiment, the light shape adjusting component 130 has a light incidence surface S131, a side surface S132, and a light emergence surface S133. The side surface S132 connects the light incidence surface S131 and the light emergence surface S133. The light incidence surface S131 protrudes toward the light emitting component 110.

More specifically, in the present embodiment, the light incidence surface S131 is an aspheric surface having a columnar curved surface, which may be defined by an aspheric curve formula as follows:

$$Z = \frac{(1/R)H^2}{1+\sqrt{1-(1+K)(H/R)^2}} + AH^4 + BH^6 + CH^8 + DH^{10} + EH^{12} + FH^{14},$$

where Z is an offset of an optical axis direction. R is a radius of an osculating sphere, that is, a radius of curvature near an optical axis, and an inverse value (1/R) is a curvature parameter. K is a conic constant. H is an aspheric height, which is a height from a center of a lens to an edge of the lens. It can be known from the formula that different Hs correspond to different Z values. A, B, C, D, E, and F are aspheric coefficients. More specifically, since the light incidence surface S131 is an aspheric surface having a columnar curved surface, a curvature of the light incidence surface S131 in the first direction D1 is 0. Since it is an aspheric curve in the second direction D2, as shown in FIG. 3B, when a contour of the light shape adjusting component 130 is projected on a first reference plane having a normal vector parallel to the first direction D1, H in the formula refers to a distance between the light incidence surface S131 in the second direction D2 and a principal optical axis of the light emitting component 110, and the first reference plane is equivalent to a plane formed by the second direction D2 and the third direction D3.

Further, when designing the contour of the light shape adjusting component 130, the curvature parameter, the conic constant, and the plurality of aspheric coefficients in the aforementioned formula can be taken into consideration for the function of the light shape adjusting component 130 meet the actual requirements. For example, the curvature parameter 1/R in the formula is adjusted to control the width of the light beam L after emergence. As the curvature is higher, the second length L2 of the strip lighting region LR in the second direction D2 is larger. The conic constant K in the formula is adjusted to change the density distribution of the light beam L to achieve uniform distribution of the strip lighting region LR. Besides, the plurality of aspheric coefficients such as A, B, C, D, E, and F can be fine-tuned step by step as required to further improve the lighting uniformity.

Figure 3A:
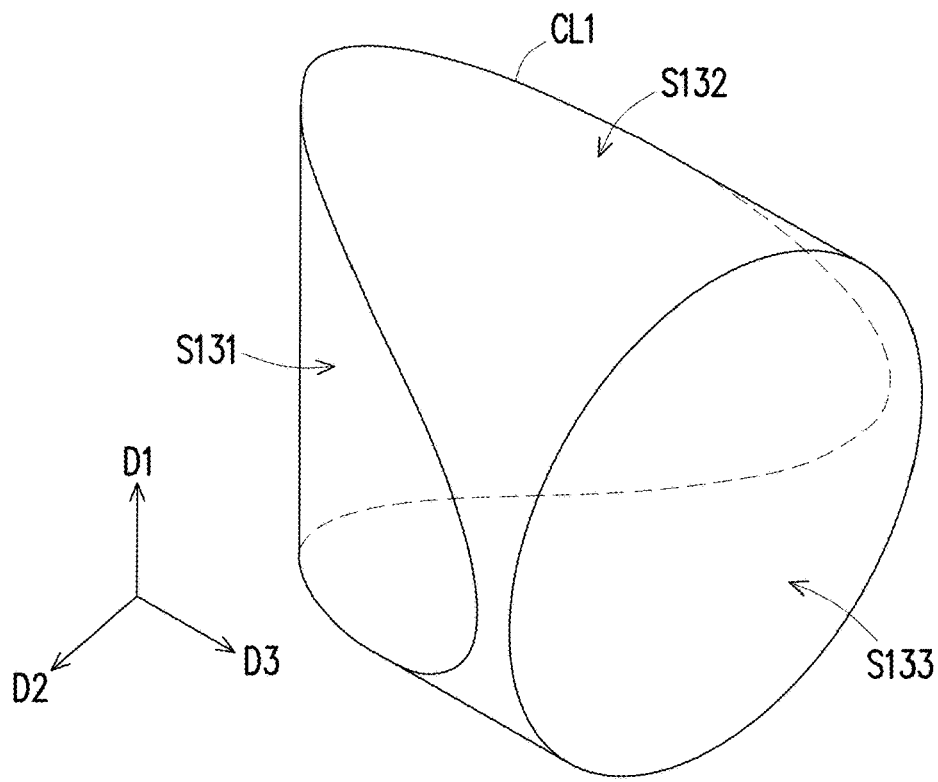
FIG. 3A to FIG. 3D are schematic structural views of a light shape adjusting component of FIG. 1A at different viewing angles.
Figure 3B:
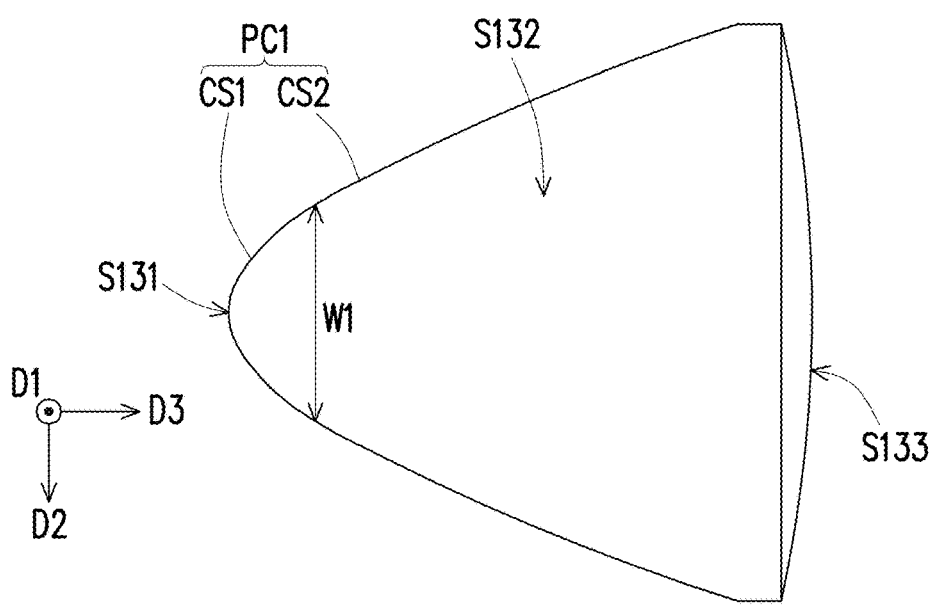
Figure 4A:
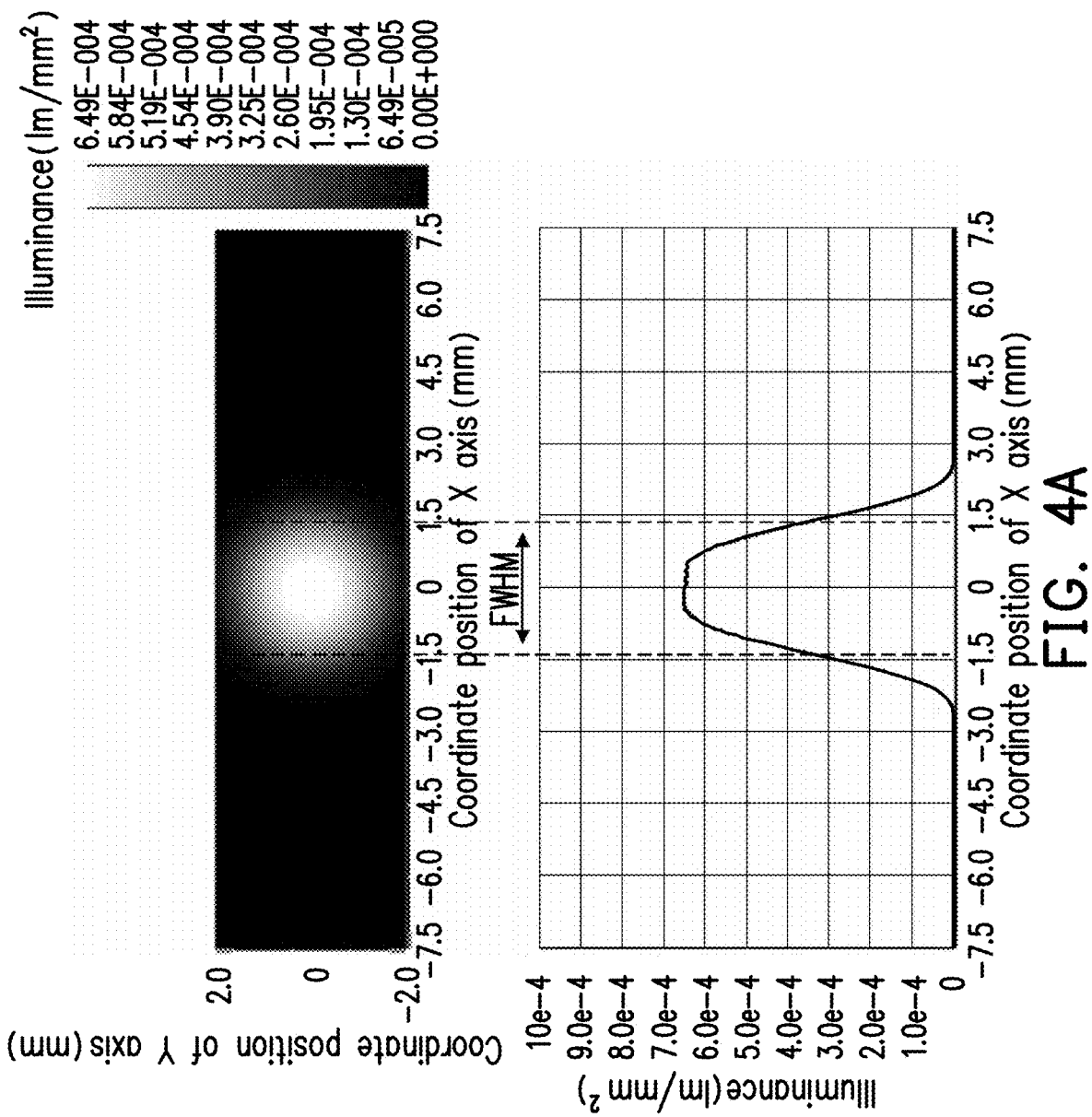
FIG. 4A is a light shape distribution diagram and a schematic light emitting distribution curve diagram of a light beam of FIG. 2 before the light beam passes through the light shape adjusting component.
Figure 4B:
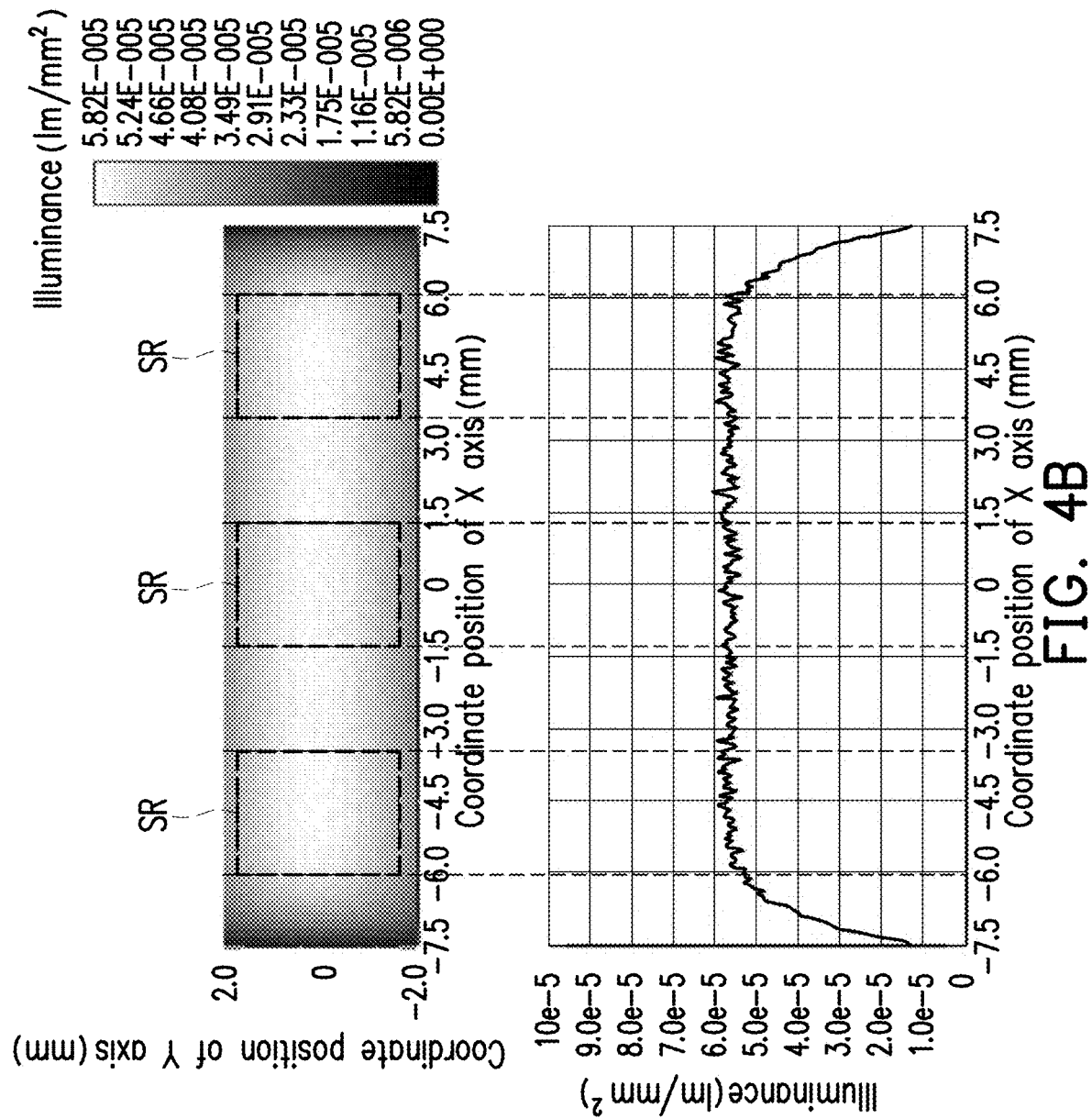
FIG. 4B is a light shape distribution diagram and a schematic light emitting distribution curve diagram of the light beam of FIG. 2 after the light beam passes through the light shape adjusting component.

More specifically, as shown in FIG. 3B, when the contour of the light shape adjusting component 130 is projected on the first reference plane, a projection of a first curve CL1 formed by connecting the light incidence surface S131 and the side surface S132 on the first reference plane is a first contour line PC1, and the first contour line PC1 protrudes toward the light emitting component 110. The first contour line PC1 has a first curved line segment CS1 and two second curved line segments CS2, the first curved line segment CS1 connecting the two second curved line segments CS2. Further, in the present embodiment, the width of the contour of the first curved line segment CS1 depends on an adjustment value of the curvature parameter 1/R in the aforementioned formula, and the contour of the second curved line segment CS2 depends on the adjustment of the conic constant in the aforementioned formula.

Further, referring to FIG. 4A, the upper half of FIG. 4A shows a light shape distribution of the light beam L of FIG. 2 in the first direction D1 and the second direction D2 before the light beam L passes through the light shape adjusting component 130. As shown in the figure, in the present embodiment, the second direction D2 is, for example, an X axis, the first direction D1 is, for example, a Y axis, and a horizontal axis and a vertical axis of the light shape distribution diagram of the upper half of FIG. 4A represent coordinate positions of the X axis and the Y axis in millimeters respectively. A gray-scale diagram at the upper right of FIG. 4A shows the illuminance of the light shape distribution in lumen per square millimeter (1 m/mm$^2$). The lower half of FIG. 4A shows a schematic light emitting distribution curve diagram of the light beam L of FIG. 2 in the second direction D2 before the light beam L passes through the light shape adjusting component 130. As shown in the figure, a horizontal axis and a vertical axis of the schematic light emitting distribution curve diagram represent a coordinate position of the X axis and illuminance. As shown in FIG. 4A, in the present embodiment, the curvature parameter is set according to a full width at half maximum FWHM of a distribution curve of the light beam L in the second direction D2 before the light beam L passes through the light shape adjusting component 130. Thus, as shown in FIG. 2, a central portion of the light beam L can be diffused to a large extent to unify the luminous flux of the central portion of the strip lighting region LR and control the width of the light beam L after emergence. In other words, in the present embodiment, the first curved line segment CS1 of the first contour line PC1 is a circular arc line segment, the first curved line segment CS1 has a first width W1 in the second direction D2, and the first width W1 corresponds to a full width at half maximum FWHM of a distribution curve of a luminous flux of the light beam L in the second direction D2. The value of the curvature parameter of the first curved line segment CS1 is adjusted to unify the luminous flux of the central portion of the strip lighting region LR and control the width of the light beam L after emergence.

On the other hand, in the present embodiment, the value of the conic constant may be set to −1, and the light incidence surface S131 of the light shape adjusting component 130 has a parabolic gradient contour on both sides. In other words, in the present embodiment, the two second curved line segments CS2 of the first contour line PC1 are parabolic line segments. In this way, as shown in FIG. 2, by means of the parabolic gradient contour on both sides of the light shape adjusting component 130, both side portions of the light beam L can be uniformly distributed on both sides after the light beam L passes through the light shape adjusting component 130, and the strip lighting region LR is uniformly distributed.

For example, in the present embodiment, an R value in the aforementioned formula may be set to a value of about 1.2, and correspondingly, a plurality of aspheric coefficients such as A and B may be set to be between 1.1 and 1.3 as required, so as to further improve the lighting uniformity by gradual fine-tuning. It is to be noted that the value ranges here are intended to be illustrative only and not to limit the disclosure.

In this way, referring to FIG. 4B, the upper half of FIG. 4B shows the light shape distribution of the light beam L of FIG. 2 in the first direction D1 and the second direction D2 after the light beam L passes through the light shape adjusting component 130, and the lower half of FIG. 4B shows the schematic light emitting distribution curve diagram of the light beam L of FIG. 2 in the second direction D2 after the light beam L passes through the light shape adjusting component 130. In FIG. 4B, the values of the horizontal axis and the vertical axis of the light shape distribution diagram and the schematic light emitting distribution curve diagram as well as the representative significances thereof are the same as those of FIG. 4A, and the units are the same. As shown in FIG. 4B, by means of the adjustment and optimization of the aforementioned parameters, the light beam L having an original distribution curve in a Gaussian distribution can be linearly shaped when passing through the light shape adjusting component 130 to form a strip lighting region LR with uniform luminous flux distribution.

Further, as shown in FIG. 4B, the strip lighting region LR has a plurality of sub-lighting regions SR. The sub-lighting regions SR have the same size and do not overlap each other. A ratio of a difference between a luminous flux passing through any of the sub-lighting regions SR and a luminous flux passing through another sub-lighting region SR to an averaged luminous flux passing through the sub-lighting regions SR is not greater than 4%. Thus, as shown in FIG. 1B, FIG. 1C, and FIG. 4B, since the difference between the luminous flux passing through any of the sub-lighting regions SR of the strip lighting region LR and the luminous flux passing through another sub-lighting region SR is kept at a certain ratio, each object to be detected O corresponding to each sub-lighting region SR of the strip lighting region LR can be uniformly illuminated at the same time by providing only the single light emitting component 110 and the single band pass filter 120.

Figure 3C:
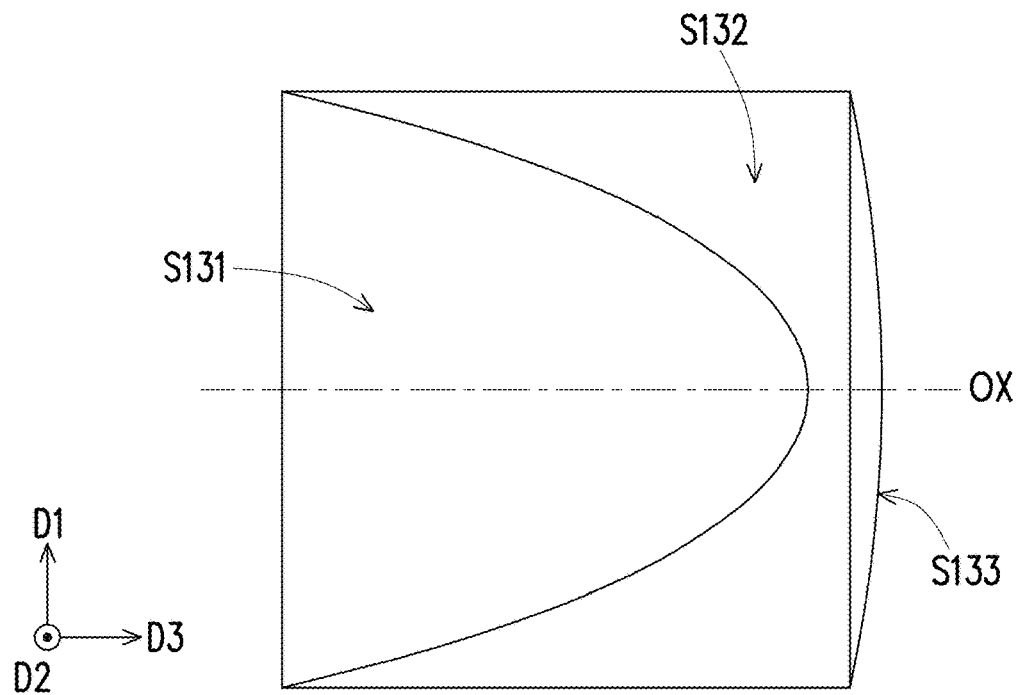
Figure 3D:
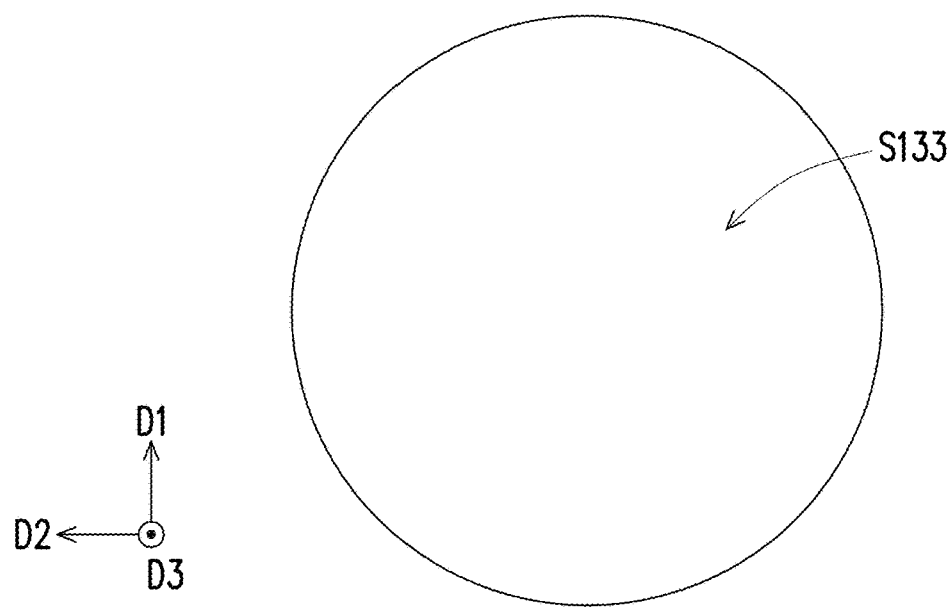

On the other hand, as shown in FIG. 3C, in the present embodiment, a projection of a distance between the light incidence surface S131 and the light emergence surface S133 of the light shape adjusting component 130 on a second reference plane is shorter while being closer to a principal optical axis OX of the light emitting component 110, and a normal vector of the second reference plane is parallel to the second direction D2, that is, the second reference plane is equivalent to a plane formed by the first direction D1 and the third direction D3. Moreover, as shown in FIG. 2, FIG. 3B to FIG. 3D, the light emergence surface S133 of the light shape adjusting component 130 is an axis-symmetric spherical curved surface and protrudes toward a side away from the light emitting component 110. Thus, by means of the configuration of the light emergence surface S133, secondary density distribution adjustment of the divergent light beam L can be performed, and the working distance can be reduced under the premise of achieving equal uniformity, thereby improving the product space utilization rate.

In view of the foregoing, according to the detection light source module and the detection device of the disclosure, with the configuration of the light shape adjusting component, the strip lighting region can be formed by providing only the single light emitting component and the single band pass filter. In addition, the difference between the luminous flux passing through any of the sub-lighting regions of the strip lighting region and the luminous flux passing through another sub-lighting region is kept at a certain ratio, and the objects to be detected at different positions in the space can be uniformly illuminated at the same time. As a result, uniform lighting can be performed at a large scale and in a high efficiency in a limited space. In this way, the required numbers of the light emitting components and the corresponding band pass filters in the detection light source module and the detection device can be reduced, the light path can be simplified, and the manufacturing and assembling complexity can be reduced, thereby reducing the product cost and improving the manufacturing quality. Moreover, the detection accuracy and reliability of the detection device using the detection light source module can be improved as well.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A detection light source module, comprising:
a light emitting component, adapted to provide a light beam;
a light shape adjusting component, located on a transmission path of the light beam and adapted to adjust a light shape of the light beam, wherein the light beam forms a strip lighting region through the light shape adjusting component, the strip lighting region comprises a plurality of sub-lighting regions that are of the same size and do not overlap each other, the strip lighting region is of a first length in a first direction and of a second length in a second direction, the second length is greater than the first length; and
a single band pass filter, located on the transmission path of the light beam and located between the light emitting component and the light shape adjusting component,
wherein the light shape adjusting component comprises a light incidence surface, a side surface, and a light emergence surface, the side surface connects the light incidence surface and the light emergence surface, the light incidence surface protrudes toward the light emitting component, a projection of a first curve formed by connecting the light incidence surface and the side surface on a first reference plane is a first contour line, a normal vector of the first reference plane is parallel to the first direction, and the first contour line protrudes toward the light emitting component,
wherein the first contour line comprises a first curved line segment and two second curved line segments, the first curved line segment connects the two second curved line segments, the first curved line segment is a circular arc line segment, and the two second curved line segments are parabolic line segments.

2. The detection light source module according to claim 1, wherein the first curved line segment is of a first width in the second direction, and the first width corresponds to a full width at half maximum of a distribution curve of a luminous flux of the light beam in the second direction.

3. The detection light source module according to claim 1, wherein the light emergence surface is a spherical surface and protrudes toward a side away from the light emitting component.

4. The detection light source module according to claim 1, wherein a ratio of a difference between a luminous flux passing through any of the sub-lighting regions and a luminous flux passing through another sub-lighting region of the sub-lighting regions to an averaged luminous flux passing through the sub-lighting regions is not greater than 4%.

5. A detection device, comprising:
a detection light source module, comprising:
- a light emitting component, adapted to provide a light beam;
- a light shape adjusting component, located on a transmission path of the light beam and adapted to adjust a light shape of the light beam, wherein the light beam forms a strip lighting region through the light shape adjusting component, the strip lighting region comprises a plurality of sub-lighting regions that are of the same size and do not overlap each other, the strip lighting region is of a first length in a first direction and of a second length in a second direction, the second length is greater than the first length, wherein the light shape adjusting component comprises a light incidence surface, a side surface, and a light emergence surface, the side surface connects the light incidence surface and the light emergence surface, the light incidence surface protrudes toward the light emitting component, a projection of a first curve formed by connecting the light incidence surface and the side surface on a first reference plane is a first contour line, a normal vector of the first reference plane is parallel to the first direction, and the first contour line protrudes toward the light emitting component,
wherein the first contour line comprises a first curved line segment and two second curved line segments, the first curved line segment connects the two second curved line segments, the first curved line segment is a circular arc line segment, and the two second curved line segments are parabolic line segments; and a single band pass filter, located on the transmission path of the light beam and located between the light emitting component and the light shape adjusting component; and a frame, comprising a plurality of sleeve structures for accommodating a plurality of objects to be detected, wherein a surface, facing the detection light source module, of each of the sleeve structures is provided with an opening, and each of the openings exposes each of the objects to be detected and corresponds to each of the sub-lighting regions, such that at least a portion of the object to be detected accommodated in each of the sleeve structures is located in each of the sub-lighting regions.

6. The detection device according to claim 5, wherein each of the openings is of a first dimension in the first direction, the frame comprises a first end and a second end in the second direction, a second dimension is provided between an edge of one of the openings closest to the first end and an edge of another of the openings closest to the second end, the first length of the strip lighting region is greater than the first dimension, and the second length of the strip lighting region is greater than the second dimension.

7. The detection device according to claim 5, wherein the first curved line segment is of a first width in the second direction, and the first width corresponds to a full width at half maximum of a distribution curve of a luminous flux of the light beam in the second direction.

8. The detection device according to claim 5, wherein the light emergence surface is a spherical surface and protrudes toward a side away from the light emitting component.

9. The detection device according to claim 5, wherein a ratio of a difference between a luminous flux passing through any of the sub-lighting regions and a luminous flux passing through another sub-lighting region of the sub-lighting regions to an averaged luminous flux passing through the sub-lighting regions is not greater than 4%.

* * * * *